United States Patent
Zhu et al.

(10) Patent No.: US 11,889,330 B2
(45) Date of Patent: Jan. 30, 2024

(54) METHODS AND RELATED DEVICES FOR IMPLEMENTING DISASTER RECOVERY

(71) Applicant: ZTE Corporation, Shenzhen (CN)

(72) Inventors: Ming Zhu, Shenzhen (CN); Lichang Hou, Shenzhen (CN); Xuexin Ding, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 313 days.

(21) Appl. No.: 17/295,618

(22) PCT Filed: Nov. 18, 2019

(86) PCT No.: PCT/CN2019/119193
§ 371 (c)(1),
(2) Date: May 20, 2021

(87) PCT Pub. No.: WO2020/103796
PCT Pub. Date: May 28, 2020

(65) Prior Publication Data
US 2022/0022062 A1   Jan. 20, 2022

(30) Foreign Application Priority Data

Nov. 23, 2018   (CN) .......................... 201811415354.7

(51) Int. Cl.
*H04W 24/04*   (2009.01)
*H04W 76/18*   (2018.01)
(Continued)

(52) U.S. Cl.
CPC ............. *H04W 24/04* (2013.01); *H04W 4/90* (2018.02); *H04W 36/0033* (2013.01); *H04W 36/12* (2013.01); *H04W 76/18* (2018.02)

(58) Field of Classification Search
CPC . H04W 24/04; H04W 36/12; H04W 36/0033; H04W 76/18; H04W 76/19
See application file for complete search history.

(56) References Cited

U.S. PATENT DOCUMENTS

2018/0279411 A1   9/2018 Kang
2019/0116546 A1*  4/2019 Kang .................... H04W 68/02
(Continued)

FOREIGN PATENT DOCUMENTS

CN   108462735 A   8/2018
CN   108605259 A   9/2018
(Continued)

OTHER PUBLICATIONS

International Search Report for corresponding application PCT/CN2019/119193 filed Nov. 18, 2019; dated Feb. 1, 2019.
(Continued)

*Primary Examiner* — Allahyar Kasraian
(74) *Attorney, Agent, or Firm* — CANTOR COLBURN LLP

(57) ABSTRACT

Provided are methods and related devices for implementing disaster recovery. According to a method, in a case where a main Session Management Function (SMF) fails, a backup SMF sends a first request to a User Plane Function (UPF), wherein the first request carries a node identifier (Node ID) of the main SMF, a Node ID of the backup SMF, and a Common Session endpoint Identifier List (CSIDLIST) corresponding to the backup SMF; and the first request is used for notifying the UPF that the main SMF fails and a session or sessions in the CSIDLIST corresponding to the backup SMF is/are to be taken over by the backup SMF, so that the UPF subsequently interacts with the backup SMF for the session or sessions in the CSIDLIST corresponding to the backup SMF.

20 Claims, 7 Drawing Sheets

(51) Int. Cl.
*H04W 4/90* (2018.01)
*H04W 36/00* (2009.01)
*H04W 36/12* (2009.01)

(56) References Cited

U.S. PATENT DOCUMENTS

| | | | |
|---|---|---|---|
| 2020/0178336 A1* | 6/2020 | Li | H04L 65/1045 |
| 2020/0252785 A1* | 8/2020 | Wu | H04W 28/06 |
| 2020/0280958 A1* | 9/2020 | Zhu | H04W 68/02 |
| 2020/0336937 A1* | 10/2020 | Youn | H04W 76/12 |
| 2021/0306211 A1* | 9/2021 | Landais | H04L 43/20 |
| 2021/0320897 A1* | 10/2021 | Stojanovski | H04W 4/50 |
| 2021/0385642 A1* | 12/2021 | Di Girolamo | H04W 8/18 |

FOREIGN PATENT DOCUMENTS

| | | |
|---|---|---|
| CN | 108605269 A | 9/2018 |
| CN | 108696950 A | 10/2018 |
| CN | 108738082 A | 11/2018 |
| CN | 108809681 A | 11/2018 |
| CN | 111083718 A * | 4/2020 |
| WO | 2018126535 A1 | 7/2018 |

OTHER PUBLICATIONS

3GPP, 3rd Generation Partnership Project: Technical Specification Group Core Network and Terminals; 5G System; Restoration Procedures, Sep. 2018, XP51475169.

3GPP, 3rd Generation Partnership Project: Technical Specification Group Core Network and Terminals; Interface between the control plane and the User Plane Nodes, Sep. 2018, XP51487290.

3GPP, TSG CT WG4 Meeting #86bis, Vilnius Republic of Lithuania, Oct. 15-19, 2018; XP51574425A.

3GPP, TSG CT WG4 Meeting #86bis, West Palm Beach USA, Aug. 20-24, 2018; XP51574868A.

3GPP, TSG CT WG4 Meeting #86bis, West Palm Beach USA, Detecting NF (e.g SMF) Failure and Restart using the NRF; Aug. 20-24, 2018; XP51574926A.

* cited by examiner

In a case where a main SMF fails, a backup SMF sends a first
request to a UPF, wherein the first request carries a Node ID of the
main SMF, a Node ID of the backup SMF and a CSIDLIST
corresponding to the backup SMF, and the first request is used for
notifying the UPF that the main SMF fails and a session or sessions
in the CSIDLIST corresponding to the backup SMF is/are to be
taken over by the backup SMF, so that the UPF subsequently
interacts with the backup SMF for the session or sessions in the
CSIDLIST corresponding to the backup SMF — 101

Fig.1

A UPF receives a first request sent by a backup SMF, wherein the
first request carries a Node ID of a main SMF, a Node ID of the
backup SMF, and a CSIDLIST corresponding to the backup SMF,
and the first request is used for notifying the UPF that the main SMF — 201
fails and a session or sessions in the CSIDLIST corresponding to the
backup SMF is/are to be taken over by the backup SMF

↓

The UPF records a correspondence table between the main SMF and
the backup SMF according to the first request, and subsequently
interacts with the backup SMF for a session or sessions in the
CSIDLIST corresponding to the backup SMF, wherein the — 202
correspondence table includes a state of the main SMF, the backup
SMF corresponding to the main SMF, and the CSIDLIST
corresponding to the backup SMF

Fig.2

| Message Type value (Decimal) | Message | Applicability | | | |
|---|---|---|---|---|---|
| | | Sxa | Sxb | Sxc | N4 |
| .... | ............ | ... | ... | ... | ... |
| 41 | PFCP Session Set Modification Request | X | X | X | X |
| 42 | PFCP Session Set Modification Response | X | X | X | X |
| .... | ............ | ... | ... | ... | ... |

Fig. 3

| Information elements | P | Condition / Comment | IE Type |
|---|---|---|---|
| Dest Node ID | M | This IE shall contain the node identity of the destination node which will process the CSID List. | Node ID |
| Origin Node ID | M | This IE shall contain the node identity of the originating node which processed the CSID List. | Node ID |
| CSID List | M | This IE shall include all sessions to be migrated. | FQ-CSID |

Fig. 4

| Information elements | P | Condition / Comment | IE Type |
|---|---|---|---|
| Node ID | M | This IE shall contain the unique identifier of the sending node. | Node ID |
| Cause | M | This IE shall indicate the acceptance or the rejection of the corresponding request message. | Cause |

Fig. 5

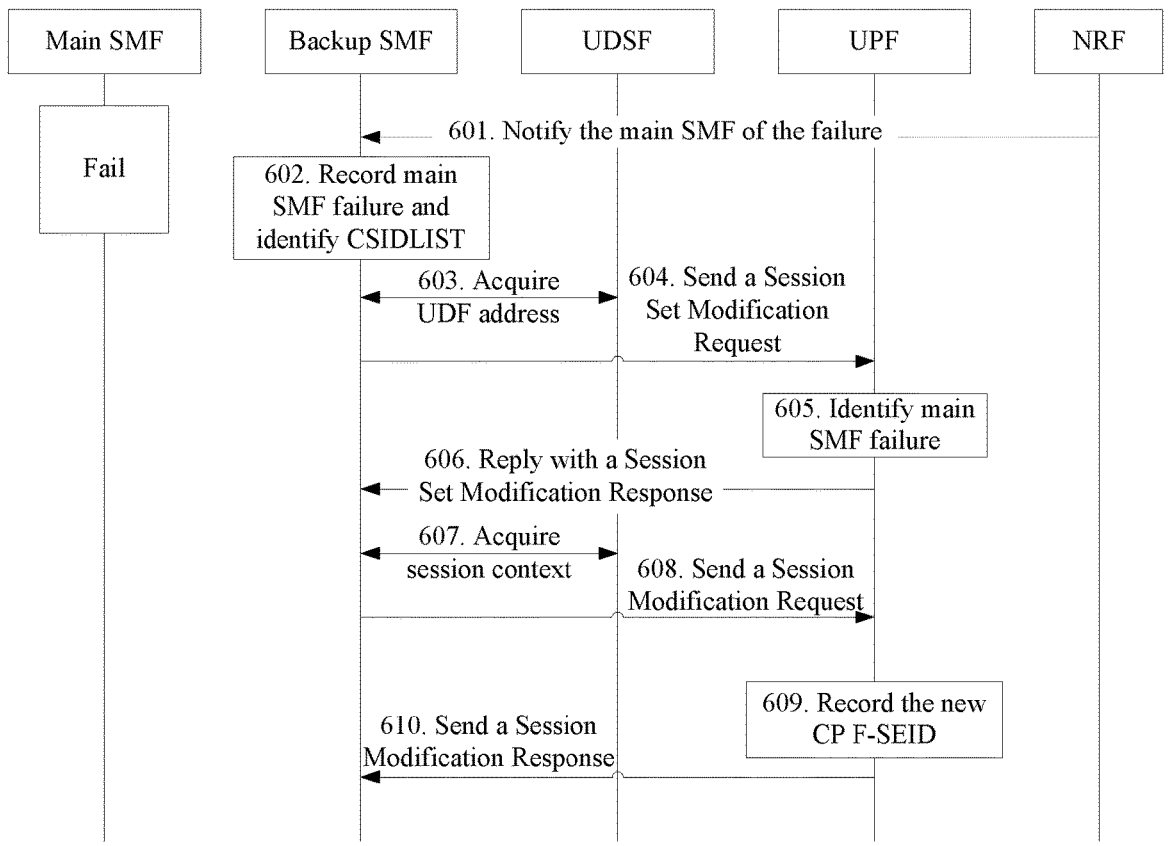

Fig. 6

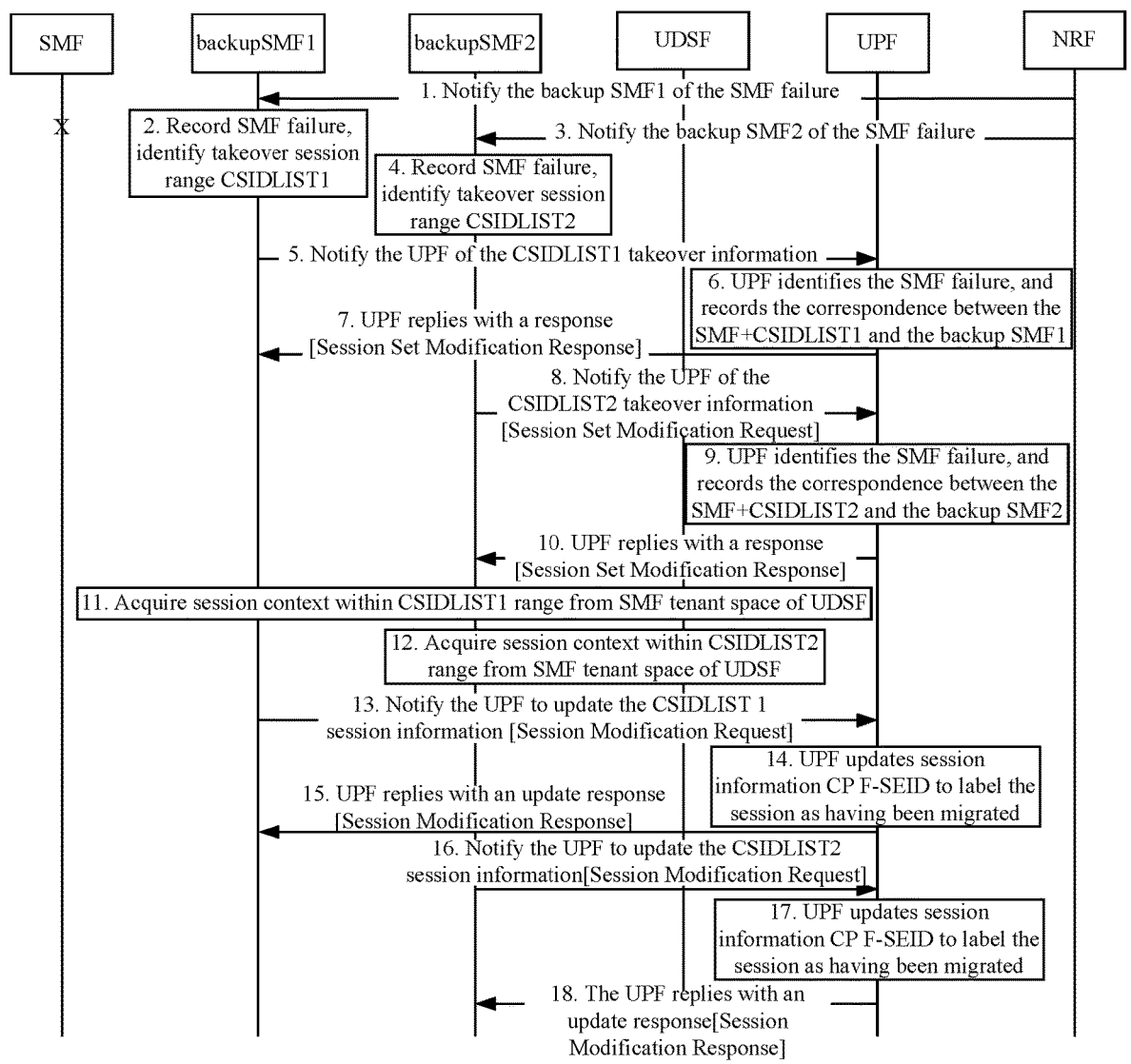

Fig. 7

In a case where a backup SMF has taken over a CSIDLIST corresponding to the backup SMF and a main SMF recovers from a failure, the main SMF sends a third request to a UPF, wherein the third request carries a Node ID of the main SMF, a Node ID of the backup SMF and a CSIDLIST corresponding to the main SMF, and the third request is used for notifying the UPF that the main SMF recovers from the failure and that a session or sessions in the CSIDLIST corresponding to the main SMF is/are to be taken over by the main SMF, so that the UPF subsequently interacts with the main SMF for the session or sessions in the CSIDLIST corresponding to the main SMF

METHODS AND RELATED DEVICES FOR IMPLEMENTING DISASTER RECOVERY

CROSS REFERENCE

This application is a National Stage Filing of the PCT International Application No. PCT/CN2019/119193 filed on Nov. 18, 2019, which claims priority to the Chinese Application No. 201811415354.7 filed on Nov. 23, 2018, the entirety of which is herein incorporated by reference.

TECHNICAL FIELD

Embodiments of the present disclosure relate to, but are not limited to, a disaster recovery technology, and more particularly to methods and related devices for implementing disaster recovery.

BACKGROUND

In the control plane/user plane (CU, where C represents Control plane, and U represents User plane) separation architecture, a Session Management Function (SMF) of a Control Plane (CP) and a User Plane Function (UPF) of a User Plane (UP) perform message communication through a CUPS (Control and User Plane Separation of EPC nodes) protocol of an N4 interface. According to an application type of a Packet Forwarding Control Protocol (PFCP) interface message, the message can be divided into a node-type message and a session-type message. The node-type message is mainly used for coupling, heartbeat detection and the like between C and U, and the session-type message is used for session establishment, modification, release and the like between the SMF and the UPF.

In a conventional art, in a case where an SMF is down due to a failure, the UPF cannot acquire information of a backup SMF and the original session information, thereby resulting in session release, which affects user experience.

SUMMARY

In view of the above, an embodiment of the present disclosure provides a method for implementing disaster recovery, including the following operations.

In a case where a main SMF fails, a backup SMF sends a first request to a UPF, wherein the first request carries a Node ID of the main SMF, a Node ID of the backup SMF and a Common Session endpoint Identifier List (CSIDLIST) corresponding to the backup SMF, and the first request is used for notifying the UPF that the main SMF fails and a session or sessions in the CSIDLIST corresponding to the backup SMF is/are to be taken over by the backup SMF, so that the UPF subsequently interacts with the backup SMF for the session or sessions in the CSIDLIST corresponding to the backup SMF.

In view of the above, an embodiment of the present disclosure provides a method for implementing disaster recovery, including the following operations.

A UPF receives a first request sent by a backup SMF, wherein the first request carries a Node ID of a main SMF, a Node ID of the backup SMF, and a CSIDLIST corresponding to the backup SMF, and the first request is used for notifying the UPF that the main SMF fails and a session or sessions in the CSIDLIST corresponding to the backup SMF is/are to be taken over by the backup SMF.

The UPF records a correspondence table between the main SMF and the backup SMF according to the first request, and subsequently interacts with the backup SMF for the session or sessions in the CSIDLIST corresponding to the backup SMF, wherein the correspondence table includes a state of the main SMF, the backup SMF corresponding to the main SMF, and the CSIDLIST corresponding to the backup SMF.

In view of the above, an embodiment of the present disclosure provides a method for implementing disaster recovery, including the following operations.

In a case where a backup SMF has taken over a CSIDLIST corresponding to the backup SMF and a main SMF recovers from a failure, the main SMF sends a third request to a UPF, wherein the third request carries a Node ID of the main SMF, a Node ID of the backup SMF, and a CSIDLIST corresponding to the main SMF, and the third request is used for notifying the UPF that the main SMF recovers from the failure and that a session or sessions in the CSIDLIST corresponding to the main SMF is/are to be taken over by the main SMF, so that the UPF subsequently interacts with the main SMF for the session or sessions in the CSIDLIST corresponding to the main SMF.

In view of the above, an embodiment of the present disclosure provides a method for implementing disaster recovery, including the following operations.

A UPF receives a third request sent by a main SMF, wherein the third request carries a Node ID of the main SMF, a Node ID of a backup SMF, and a CSIDLIST corresponding to the main SMF, and the third request is used for notifying the UPF that the main SMF recovers from a failure and a session or sessions in the CSIDLIST corresponding to the main SMF is/are to be taken over by the main SMF.

The UPF sets a state of the main SMF in a stored correspondence table between the main SMF and the backup SMF to normal according to the third request, and subsequently interacts with the main SMF for the session or sessions in the CSIDLIST corresponding to the main SMF, wherein the correspondence table includes the state of the main SMF, the backup SMF corresponding to the main SMF, and the CSIDLIST corresponding to the backup SMF.

In view of the above, an embodiment of the present disclosure provides a backup SMF, including:

a sending unit, configured to send a first request to a UPF in a case where a main SMF fails, wherein the first request carries a Node ID of the main SMF, a Node ID of the backup SMF and a CSIDLIST corresponding to the backup SMF, and the first request is used for notifying the UPF that the main SMF fails and a session or sessions in the CSIDLIST corresponding to the backup SMF is/are to be taken over by the backup SMF, so that the UPF subsequently interacts with the backup SMF for the session or sessions in the CSIDLIST corresponding to the backup SMF.

In view of the above, an embodiment of the present disclosure provides a UPF, including:

a receiving unit, configured to receive a first request sent by a backup SMF, wherein the first request carries a Node ID of a main SMF, a Node ID of the backup SMF, and a CSIDLIST corresponding to the backup SMF, and the first request is used for notifying the UPF that the main SMF fails and a session or sessions in the CSIDLIST corresponding to the backup SMF is/are to be taken over by the backup SMF; and a processing unit, configured to record a correspondence table between the main SMF and the backup SMF according to the first request, and subsequently interact with the backup SMF for the session or sessions in the CSIDLIST corresponding to the backup SMF, wherein the correspondence table includes a state of the main SMF, the backup SMF corresponding to the main SMF, and the CSIDLIST corresponding to the backup SMF.

In view of the above, an embodiment of the present disclosure provides a main SMF, including:

a sending unit, configured to send a third request to a UPF in a case where a backup SMF has taken over a session or sessions in a CSIDLIST corresponding to the backup SMF and the main SMF recovers from a failure, wherein the third request carries a Node ID of the main SMF, a Node ID of the backup SMF, and a CSIDLIST corresponding to the main SMF, and the third request is used for notifying the UPF that the main SMF recovers from the failure and that a session or sessions in the CSIDLIST corresponding to the main SMF is/are to be taken over by the main SMF, so that the UPF subsequently interacts with the main SMF for the session or sessions in the CSIDLIST corresponding to the main SMF.

In view of the above, an embodiment of the present disclosure provides a UPF, including:

a receiving unit, configured to receive a third request sent by a main SMF, wherein the third request carries a Node ID of the main SMF, a Node ID of a backup SMF, and a CSIDLIST corresponding to the main SMF, and the third request is used for notifying the UPF that the main SMF recovers from a failure and a session or sessions in the CSIDLIST corresponding to the main SMF is/are to be taken over by the main SMF; and a processing unit, configured to set a state of the main SMF in a stored correspondence table between the main SMF and the backup SMF to normal according to the third request, and to subsequently interact with the main SMF for the session or sessions in the CSIDLIST corresponding to the main SMF, wherein the correspondence table includes the state of the main SMF, the backup SMF corresponding to the main SMF, and the CSIDLIST corresponding to the backup SMF.

In view of the above, an embodiment of the present disclosure provides a backup SMF, including a memory, a processor, and a computer program stored in the memory and capable of running on the processor. The computer program, when executed by the processor, performs the method for implementing the disaster recovery executed by the backup SMF.

In view of the above, an embodiment of the present disclosure provides a main SMF, including a memory, a processor and a computer program stored in the memory and capable of running on the processor. The computer program, when executed by the processor, performs the method for implementing the disaster recovery executed by the main SMF.

In view of the above, an embodiment of the present disclosure provides a UPF, including a memory, a processor, and a computer program stored in the memory and capable of running on the processor. The computer program, when executed by the processor, performs any method for implementing the disaster recovery executed by the UPF.

In view of the above, an embodiment of the present disclosure provides a computer readable storage medium. The computer readable storage medium stores an information processing program, and when the information processing program is executed by a processor, the operations of implementing disaster recovery as described in any one of the foregoing embodiments are implemented.

In view of the above, an embodiment of the present disclosure provides a system for implementing disaster recovery, including any one of the backup SMFs, any one of the main SMFs, and any one of the UPFs.

Compared with the conventional art, the embodiments of the present disclosure provide methods and related devices for implementing disaster recovery. According to one of the methods, in a case where a main SMF fails, a backup SMF sends a first request to a UPF, wherein the first request carries a Node ID of the main SMF, a Node ID of the backup SMF and a CSIDLIST corresponding to the backup SMF, and the first request is used for notifying the UPF that the main SMF fails and a session or sessions in the CSIDLIST corresponding to the backup SMF is/are to be taken over by the backup SMF, so that the UPF subsequently interacts with the backup SMF for the session or sessions in the CSIDLIST corresponding to the backup SMF. In this way, in a case where the main SMF fails, the UPF can identify the failed main SMF and acquire the backup SMF and the original session information, so as to implement batch session migration and ensure session continuity.

Additional features and advantages of the embodiments of the disclosure will be set forth in the description that follows, and in part will be obvious from the description, or may be learned by implementation of the embodiments of the disclosure. The objects and other advantages of the embodiments of the disclosure may be realized and attained by the structure provided in the description, claims and drawings.

BRIEF DESCRIPTION OF THE DRAWINGS

The accompanying drawings described herein are used to provide a deeper understanding of the present disclosure, and constitute a part of the present application. The drawings and the exemplary embodiments of the present disclosure are used to explain the present disclosure. The drawings and the exemplary embodiment do not constitute limitations to the present disclosure.

FIG. 1 is a schematic flowchart of a method for implementing disaster recovery according to a first embodiment of the present disclosure;

FIG. 2 is a schematic flowchart of a method for implementing disaster recovery according to a second embodiment of the present disclosure;

FIG. 3 is a schematic diagram of an extended PFCP interface message according to a third embodiment of the present disclosure;

FIG. 4 is a schematic diagram of parameters in a Session Set Modification Request according to a third embodiment of the present disclosure;

FIG. 5 is a schematic diagram of parameters in a Session Set Modification Response according to a third embodiment of the present disclosure;

FIG. 6 is a schematic flowchart of a method for implementing disaster recovery according to a fourth embodiment of the present disclosure;

FIG. 7 is a schematic flowchart of a method for implementing disaster recovery according to a fifth embodiment of the present disclosure;

FIG. 8 is a schematic flowchart of a method for implementing disaster recovery according to a sixth embodiment of the present disclosure;

DETAILED DESCRIPTION OF THE EMBODIMENTS

Figure 9:
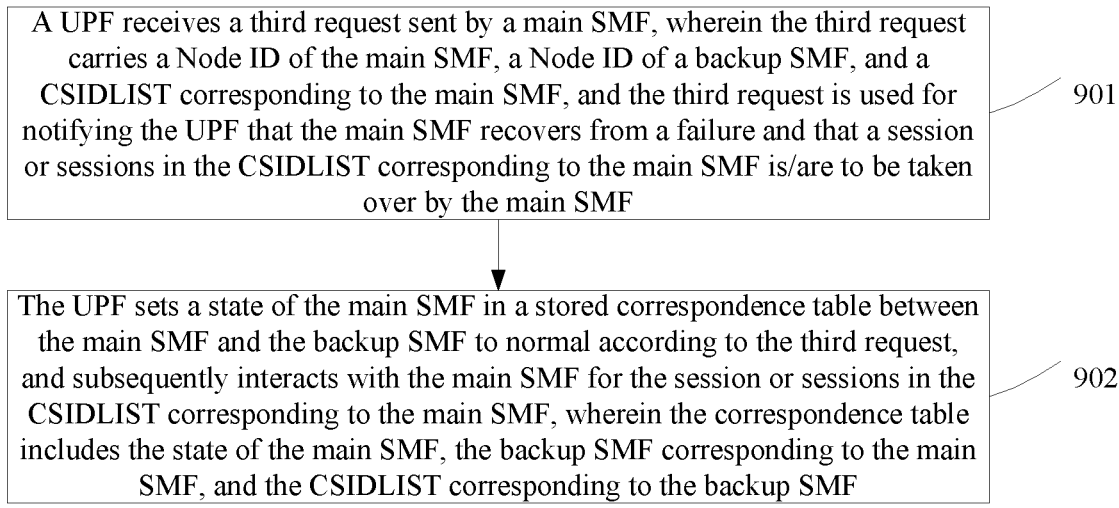
FIG. 9 is a schematic flowchart of a method for implementing disaster recovery according to a seventh embodiment of the present disclosure.

To make the objectives, technical solutions, and advantages of the embodiments of the present disclosure clearer and more comprehensible, the embodiments of the present disclosure will be described in detail with reference to the accompanying drawings. It is important to note that the embodiments in the present application and characteristics in the embodiments may be combined to derive other embodiments not explicitly described.

Operations shown in the flowchart of the drawings may be performed in a computer system such as a set of computer executable instructions. Furthermore, although a logic sequence is shown in the flowchart, in some cases, the shown or described operations may be executed in a sequence different from that shown in the flowchart.

In the current CU separation architecture, in a case where a main SMF is down due to failure, the session or sessions undertaken by the main SMF can be processed by a backup SMF of the main SMF through session migration. However, in a case where the main SMF fails, the UPF cannot acquire the backup SMF and the original session information via existing messages, which easily leads to session release and affects the user experience.

In this regard, the embodiments of the present disclosure provide technical solutions for implementing disaster recovery. In a case where an SMF is down due to failure, a backup SMF can perform batch session migration to implement load sharing while keeping an original session or original sessions uninterrupted. Meanwhile, compared with the manner of migrating sessions one by one, the total amount of messages required can be effectively reduced, and network congestion is avoided.

The technical solutions provided by the embodiments of the present disclosure are described in detail below through several exemplary embodiments.

First Embodiment

FIG. 1 is a schematic flowchart of a method for implementing disaster recovery according to a first embodiment of the present disclosure. As shown in FIG. 1, the method includes an operation 101.

In operation 101, in a case where a main SMF fails, a backup SMF sends a first request to a UPF.

According to the embodiment, the first request carries a Node ID of the main SMF, a Node ID of the backup SMF and a CSIDLIST corresponding to the backup SMF. The first request is used for notifying the UPF that the main SMF fails and a session or sessions in the CSIDLIST corresponding to the backup SMF is/are to be taken over by the backup SMF, so that the UPF subsequently interacts with the backup SMF for the session or sessions in the CSIDLIST corresponding to the backup SMF.

After the backup SMF sends the first request to the UPF, the method may further include the following operation.

The backup SMF receives a first response to the first request from the UPF.

According to some exemplary implementation of the embodiment, the first response to the first request carries the Node ID of the backup SMF. The first response to the first request is used for notifying the backup SMF that the UPF accepts or rejects the first request.

Before the backup SMF sends the first request to the UPF, the method may further include the following operations.

The backup SMF receives a notification message sent by a Network Function Repository Function (NRF).

According to some exemplary implementation of the embodiment, the notification message carries the Node ID of the main SMF, the Node ID of the backup SMF, and the CSIDLIST corresponding to the backup SMF. The notification message is used for notifying the backup SMF that the main SMF fails and the backup SMF takes over the session or sessions in the CSIDLIST corresponding to the backup SMF.

The backup SMF acquires, through an Unstructured Data Storage Function (UDSF), address information of the UPF that has established at least one session with the main SMF.

After the backup SMF sends the first request to the UPF or after the backup SMF receives the first response for accepting the first request from the UPF, the method may further include the following operation.

The backup SMF acquires context of the session or sessions in the CSIDLIST corresponding to the backup SMF from an UDSF.

After the backup SMF acquires the context of the session or sessions in the CSIDLIST corresponding to the backup SMF from the UDSF, the method may further include the following operation.

The backup SMF sends a second request to the UPF.

According to some exemplary implementation of the embodiment, the second request carries a Control Plane (CP) Fully Qualified Session Endpoint Identifier (F-SEID) acquired from the context, an Internet Protocol (IP) address in the CP F-SEID being updated to an IP address of the backup SMF. The second request is used for notifying the UPF to record the updated CP F-SEID for the session or sessions in the CSIDLIST, and set a migration flag for the session or sessions in the CSIDLIST, wherein the migration flag is used for identifying the corresponding session or sessions as migrated session or sessions.

After the backup SMF sends the second request to the UPF, the method may further include the following operation.

The backup SMF receives a second response to the second request from the UPF. According to some exemplary implementation of the embodiment, the second response to the second request carries a Node ID of the backup SMF. The second response to the second request is used for notifying the backup SMF that the UPF accepts or rejects the second request.

Before the backup SMF receives the notification message sent by the NRF, the method may further include the following operation.

The main SMF having established at least one session with the UPF registers a main-backup relation on the NRF, and sets the CSIDLIST corresponding to the backup SMF.

According to some exemplary implementation of the embodiment, the first request is an extended Packet Forwarding Control Protocol node-type message Session Set Modification Request (PFCP Session Set Modification Request).

According to some exemplary implementation of the embodiment, the first response to the first request is an extended Packet Forwarding Control Protocol node-type message Session Set Modification Response (PFCP Session Set Modification Response).

Second Embodiment

FIG. 2 is a schematic flowchart of a method for implementing disaster recovery according to a second embodiment of the present disclosure. As shown in FIG. 2, the method includes operations 201 and 202.

In operation 201, a UPF receives a first request sent by a backup SMF.

According to the embodiment, the first request carries a Node ID of a main SMF, a Node ID of the backup SMF, and a CSIDLIST corresponding to the backup SMF. The first request is used for notifying the UPF that the main SMF fails and a session or sessions in the CSIDLIST corresponding to the backup SMF is/are to be taken over by the backup SMF.

In operation 202, the UPF records a correspondence table between the main SMF and the backup SMF according to the first request, and subsequently interacts with the backup SMF for the session or sessions in the CSIDLIST corresponding to the backup SMF.

According to the embodiment, the correspondence table includes a state of the main SMF, the backup SMF corresponding to the main SMF, and the CSIDLIST corresponding to the backup SMF.

After the UPF receives the first request sent by the backup SMF, the method may further include the following operation.

The UPF sends a first response to the first request to the SMF.

According to some exemplary implementation of the embodiment, the first response to the first request carries the Node ID of the backup SMF. The first response to the first request is used for notifying the backup SMF that the UPF accepts or rejects the first request.

In a case determining, according to a condition of the UPF, that the UPF is capable of recording the correspondence table between the main SMF and the backup SMF, the UPF sends the first response for accepting the first request to the SMF.

In a case determining, according to a condition of the UPF, that the UPF is not capable of recording the correspondence table between the main SMF and the backup SMF, the UPF sends the first response for rejecting the first request to the SMF.

After the UPF records the correspondence table between the main SMF and the backup SMF according to the first request, or after the UPF sends the first response for accepting the first request to the SMF, the method may further include the following operations.

The UPF receives a second request sent by the backup SMF.

According to some exemplary implementation of the embodiment, the second request carries a CP F-SEID, an IP address in the CP F-SEID being updated to an IP address of the backup SMF. The second request is used for notifying the UPF to record the updated CP F-SEID for the session or sessions in the CSIDLIST corresponding to the backup SMF, and set a migration flag for the session or sessions in the CSIDLIST corresponding to the backup SMF, wherein the migration flag is used for identifying the corresponding session or sessions as migrated session or sessions.

The UPF records the updated CP F-SEID for the session or sessions in the CSIDLIST corresponding to the backup SMF according to the second request, and sets the migration flag for the session or sessions in the CSIDLIST in the correspondence table.

After the UPF receives the second request sent by the backup SMF, the method may further include the following operation.

The UPF sends a second response to the second request to the backup SMF.

According to some exemplary implementation of the embodiment, the second response to the second request carries the Node ID of the backup SMF. The second response to the second request is used for notifying the backup SMF that the UPF accepts or rejects the second request.

The operation of subsequently interacting with the backup SMF for the session or sessions in the CSIDLIST corresponding to the backup SMF may be implemented in the following manner.

In a case where the UPF needs to send a message or messages related to the session or sessions in the CSIDLIST corresponding to the backup SMF, the UPF acquires a state of the main SMF according to the correspondence table.

The UPF sends the message or messages to the backup SMF in a case where the state of the main SMF indicates that the main SMF fails.

The technical solutions provided by the first embodiment and the second embodiment of the present disclosure are elaborated below through several exemplary embodiments.

Third Embodiment

In a case where a main SMF fails, in order to enable the UPF to acquire the backup SMF and the original session information through PFCP interface messages, this embodiment of the present disclosure extends the definition of the existing PFCP interface messages by introducing two new messages: a session set modification request (Session Set Modification Request) and a session set modification response (Session Set Modification Response), as shown in FIG. 3.

Parameters included in the Session Set Modification Request are shown in FIG. 4, and parameters included in the Session Set Modification Response are shown in FIG. 5.

In a case where the main SMF fails, the backup SMF sends a Session Set Modification Request to the UPF, notifying the UPF of the node ID of the failed SMF and that the CSIDLIST is to be taken over by the backup SMF. The UPF records a mapping relationship between the failed SMF, the CSIDLIST taken over and the backup SMF. For example, a correspondence table between the main SMF and the backup SMF is stored, and the correspondence table includes a state of the main SMF, the backup SMF corresponding to the main SMF and the CSIDLIST corresponding to the backup SMF. The UPF executes a session migration process. Then, the UPF sends a Session Set Modification Response to the backup SMF, and subsequently interacts with the backup SMF for all sessions in the range of the CSIDLIST taken over.

A batch of sessions to be taken over by the backup SMF is defined as a Common Session Endpoint Identifier (CSID) LIST (abbreviated as CSIDLIST). For example, a group of sessions having the same attribute or feature may be defined as a CSIDLIST. These sessions may have continuous CSIDs or discontinuous CSIDs. Therefore, the session or sessions of the failed SMF may be migrated to one or more backup SMFs in batches based on the CSIDLIST.

Before the backup SMF sends the Session Set Modification Request to the UPF, in a case where an SMF is down due to a failure, an NF Repository Function (NRF) sends a state notification to the backup SMF of the SMF to notify the backup SMF that the SMF has failed and notify the backup SMF of the CSIDLIST corresponding to the backup SMF. The Backup SMF records the failure information and takes over the session or sessions of the failed SMF in the range identified by the CSIDLIST. After receiving the state notification from the NRF, the backup SMF may acquire the information of the UPF having established at least one session with the main SMF from the UDSF. For example, the backup SMF may acquire the address information of the UPF corresponding to the main SMF from the UDSF.

When being powered on, the main SMF registers a main-backup relation on the NRF, and sets a CSIDLIST corresponding to the backup SMF for the NRF after establishing at least one session with the UPF.

In a case where the main SMF recovers from a failure, the main SMF sends a Session Set Modification Request to the UPF, and notifies the UPF of the Node ID of the backup SMF and that the CSIDLIST is to be taken over by the main SMF. Then, the UPF identifies that the state of the main SMF is recovered, sets the state of the main SMF to normal in the correspondence table recording the main SMF, the CSIDLIST and the backup SMF, and executes a session reverse flow. Then, the UPF sends a Session Set Modification Response to the SMF, and subsequently interacts with the main SMF for all sessions within the range of the CSIDLIST.

In a case where the main SMF recovers from a failure, before the main SMF sends the Session Set Modification Request to the UPF, the main SMF acquires the Node ID of the backup SMF and the corresponding CSIDLIST from the NRF, and may also acquire the information of the UPF that has established at least one session with the backup SMF, for example, the address information of the UPF corresponding to the backup SMF, from the UDSF.

In addition, the first request, the first response to the first request, the third request, and the third response to the third request mentioned in the first embodiment and the second embodiment of the present disclosure may be embodied as the extended Session Set Modification Request/extended Session Set Modification Response in the third embodiment in some exemplary implementations. It may be appreciated that the first request, the first response to the first request, the third request, and the third response to the third request mentioned in the first embodiment and the second embodiment may also adopt other similar functioned message interfaces between C and U.

The technical solution provided in the third embodiment of the present disclosure may be applied to $5^{th}$ Generation (5G) architecture or a similar scenario in $4^{th}$ Generation (4G) architecture, and therefore has strong practicability and universality.

Fourth Embodiment

The fourth embodiment is applicable to a scenario where the main SMF corresponds to one backup SMF.

FIG. 6 is a schematic flowchart of a method for implementing disaster recovery according to a fourth embodiment of the present disclosure. As shown in FIG. 6, the method includes operations 601 to 610.

In operation 601, in a case where a main SMF fails, an NRF sends a notification message to a backup SMF to notify that the main SMF fails.

In the embodiment, the notification message is used for notifying the backup SMF that the main SMF fails and that the backup SMF takes over a session or sessions in a CSIDLIST corresponding to the backup SMF.

In the embodiment, the notification message carries a Node ID of the main SMF, a Node ID of the backup SMF, and the CSIDLIST corresponding to the backup SMF.

In some practical implementations, in a case where the main SMF is started up, the main SMF registers a main-backup relation on the NRF, and sets a CSIDLIST corresponding to the backup SMF according to the session or sessions having been established between the main SMF and the UPF. After the main SMF fails, the NRF notifies the backup SMF of the SMF according to the main-backup relation previously registered by the SMF.

In operation 602, the backup SMF records the failure of the main SMF according to the notification message and identifies the corresponding takeover session range CSIDLIST;

In operation 603, the backup SMF acquires the address information of the UPF that has established at least one session with the main SMF through the UDSF.

In the embodiment, the UDSF may be used to store and retrieve information of any network function (NF). The UDSF is a function in the conventional art and will not be described herein.

In operation 604, the backup SMF sends a Session Set Modification Request to the UPF.

In the embodiment, the Session Set Modification Request carries a Node ID of the backup SMF, a Node ID of the main SMF, and a CSIDLIST taken over. The Session Set Modification Request is used to notify the UPF that the session or sessions in the CSIDLIST corresponding to the node identified by this Node ID is/are to be taken over by the backup SMF.

In operation 605, the UPF identifies a failure of the main SMF according to the received Session Set Modification Request, and records a correspondence table between the failed main SMF+ CSIDLIST and the backup SMF.

In the embodiment, the correspondence table includes: the state of the main SMF (failed), the backup SMF corresponding to the main SMF, and the CSIDLIST taken over by the backup SMF.

In a case where the UPF receives the Session Set Modification Request, the operation 605 may be directly performed in normal cases. However, if the UPF is not able to process the Session Set Modification Request (for example, a possible reason may be that the UPF is overloaded making it impossible for the UPF to process the Session Set Modification Request), the UPF may directly send a Session Set Modification Response for rejecting the request to the backup SMF, and the session migration fails.

In operation 606, the UPF sends a Session Set Modification Response of accepting the request to the backup SMF.

In the embodiment, the Session Set Modification Response is used for notifying the backup SMF that the UPF accepts the Session Set Modification Request.

In operation 607, the backup SMF acquires, from the UDSF, the context of the session or sessions in the CSIDLIST taken over.

In practical implementations, the backup SMF may acquire the context of the migrated session or sessions from the SMF tenant space of the UDSF after receiving the Session Set Modification Response for accepting the request, or in response to the usage amount report of the UPF or the trigger of a CP NF.

In operation 608, the backup SMF sends a Session Modification Request to the UPF.

In the embodiment, the Session Modification Request is an existing PFCP interface message, and carries a Control Plane (CP) Fully Qualified Session Endpoint Identifier (F-SEID), wherein the original session data in the SEID part of the CP F-SEID are kept unchanged, and the IP address is updated to an IP address of the backup SMF. The Session Modification Request is used for notifying the UPF to modify the CP F-SEID of the migrated session or sessions.

In operation 609, the UPF records a new CP F-SEID according to the received Session Modification Request, and labels the session or sessions in the CSIDLIST taken over as having been migrated.

In the embodiment, in a case where the UPF receives the Session Modification Request, the operation 609 may be directly performed in normal cases. However, if the UPF is not able to process the Session Modification Request (for example, a possible reason may be that the UPF is overloaded making it impossible for the UPF to process the Session Set Modification Request), the UPF may directly send a Session Modification Response for rejecting the request to the backup SMF, and the update of the CP F-SEID fails.

In the embodiment, for the session or sessions set with a migration flag, when sending a message subsequently, the UPF needs to acquire an actual state of the main SMF according to a correspondence between the SMF+CSIDLIST and the backup SMF, and send the message to the backup SMF in a case where the main SMF fails.

In operation 610, the UPF sends a Session Modification Response to the backup SMF.

The Session Modification Response is also an existing PFCP interface message. The Session Modification Response carries a Node ID of the backup SMF, and is used for notifying the backup SMF that the UPF accepts the Session Modification Request.

According to the technical solution provided in the fourth embodiment of the present disclosure, after a main SMF is down due to a failure, a backup SMF takes over a session or sessions within the range of the CSIDLIST of the failed SMF, and notifies, via sending a PFCP Session Set Modification Request, a UPF to perform batch session migration; then, the backup SMF acquires context of the session or sessions of the main SMF from a UDSF, and notifies, via sending a PFCP Session Modification, the UPF to update session information including a CP F-SEID, and to interact with the backup SMF for the subsequent session or sessions. In this way, the messages such as the PFCP Session Set Modification Request/PFCP Session Set Modification Response are extended to implement batch session migration and ensure session continuity.

Fifth Embodiment

The fifth embodiment is applicable to a scenario where the main SMF corresponds to two backup SMFs.

FIG. 7 is a schematic flowchart of a method for implementing disaster recovery provided by the fifth embodiment of the present disclosure. As shown in FIG. 7, the method includes operations 701 to 718.

In operation 701, after a main SMF fails, an NRF notifies a backup SMF1 of the SMF according to a main-backup relation registered by the main SMF.

In operation 702, after receiving notification from the NRF, the backup SMF1 records a failure of the main SMF, and acquires a session range CSIDLIST1 to be taken over by the backup SMF1.

In the embodiment, the backup SMF1 may acquire address information of the UPF related to the session or sessions through the UDSF.

In operations 703-704, similar to the operations 701-702, the backup SMF2 starts taking over the session range CSIDLIST2.

In operation 705, the backup SMF1 sends a Session Set Modification Request to the UPF.

In the embodiment, the session Set Modification Request carries a node ID of the backup SMF1, a node ID of the main SMF, and the CSIDLIST1 taken over, and is used for notifying the UPF that the session or sessions in the CSIDLIST1 corresponding to the node identified by the node ID is/are to be taken over by the backup SMF1.

In operation 706, the UPF identifies the failure of the main SMF, and records the correspondence between the failed SMF+CSIDLIST1 and the backup SMF1.

In operation 707, the UPF sends a Session Set Modification Response to the backup SMF1.

In operation 708, the backup SMF2 sends a Session Set Modification Request to the UPF. In the embodiment, the Session Set Modification Request carries the Node ID of the backup SMF2, the Node ID of the SMF and the CSIDLIST2 taken over, and is used for notifying the UPF that the session or session in the CSIDLIST2 corresponding to the node identified by the Node ID is/are to be taken over by the backup SMF2.

In operation 709, the UPF identifies the failure of the main SMF, and records the correspondence between the failed SMF+CSIDLIST2 and the backup SMF2.

In operation 710, the UPF sends a Session Set Modification Response to the backup SMF2.

In operations 711-712, due to the usage report of the UPF or the trigger of the CP NF, the backup SMF1/backup SMF2 identifies that the session or sessions to be processed is/are a migrated session or migrated sessions, and acquires the context of the migrated session or sessions from the SMF tenant space of the UDSF.

In operation 713, the backup SMF1 sends a Session Modification Request to the UPF to update the CP F-SEID, wherein the original session data in the SEID part are kept unchanged, and the IP address is updated to the IP address of the backup SMF1.

In operation 714, after receiving the message, the UPF records the new CP F-SEID, and labels the session or sessions as migrated.

For the session or sessions set with a migration flag, when sending a message or messages subsequently, the UPF needs to acquire the actual state of the main SMF according to the correspondence between the SMF+CSIDLIST and the backup SMF1, and sends the message or messages of the session or sessions to the backup SMF1 in a case where the main SMF fails.

In operation 715, the UPF sends a Session Modification Response to the backup SMF1.

In operations 716-718, the session update process of the backup SMF2 is similar to the operations 713-715.

According to the technical solution provided in the fifth embodiment of the present disclosure, in a case where an SMF is down due to a failure, two backup SMFs, i.e., the backup SMF1 and the backup SMF2 take over two session ranges CSIDLIST1 and CSIDLIST2 of the SMF, and notify, through sending a PFCP Session Set Modification, the UPF to perform batch session migration. Then, in a case where the backup SMF1 and/or the backup SMF2 discovers that a session belongs to a migrated session, the backup SMF1 and/or the backup SMF2 acquires the session context of the SMF from the UDSF, and notifies, by sending a PFCP Session Modification message, the UPF to update session information including a CP F-SEID, and interact with the backup SMF for the subsequent session or sessions. In this way, the messages such as the PFCP Session Set Modification Request/PFCP Session Set Modification Response are extended to implement batch session migration and ensure session continuity.

The embodiments of the present disclosure also provide a technical solution for implementing disaster recovery. By extending existing messages, in a case where the main SMF recovers from a failure, a UPF can identify that the failed SMF has recovered and migrate back original session information, thereby ensuring session continuity.

Sixth Embodiment

FIG. 8 is a schematic flowchart of a method for implementing disaster recovery according to a sixth embodiment of the present disclosure. As shown in FIG. 8, the method includes an operation 801.

In operation 801, in a case where a backup SMF has taken over a CSIDLIST corresponding the backup SMF and a main SMF recovers from a failure, the main SMF sends a third request to a UPF.

In the embodiment, the third request carries a Node ID of the main SMF, a Node ID of a backup SMF, and a CSIDLIST corresponding to the main SMF. The third request is used for notifying the UPF that the main SMF recovers from a failure and that a session or sessions in the CSIDLIST corresponding to the main SMF is/are to be taken over by the main SMF, so that the UPF subsequently interacts with the main SMF for the session or sessions in the CSIDLIST corresponding to the main SMF.

Before the main SMF sends the third request to the UPF, the method may further include the following operations.

The main SMF acquires the Node ID of the backup SMF and the CSIDLIST corresponding to the main SMF from an NRF.

The main SMF acquires, through an UDSF, address information of the UPF that has established at least one session with the backup SMF.

After the main SMF sends the third request to the UPF, the method may further include the following operation.

The main SMF receives a third response to the third request from the UPF.

In some exemplary implementations of the embodiment, the third response to the third request carries a Node ID of the main SMF. The third response to the third request is used for notifying the main SMF that the UPF accepts or rejects the third request.

After the main SMF sends the third request to the UPF or after the main SMF receives the third response for accepting the third request sent by the UPF, the method may further include the following operation.

The main SMF acquires context of the session or sessions in the CSIDLIST corresponding to the main SMF from an UDSF.

After the main SMF acquires the context of the session or sessions in the CSIDLIST corresponding to the main SMF from the UDSF, the method may further include the following operation.

The main SMF sends a fourth request to the UPF.

In some exemplary implementations of the embodiment, the fourth request carries a CP F-SEID acquired from the context, an IP address in the CP F-SEID being updated to an IP address of the main SMF. The fourth request is used for notifying the UPF to record the updated CP F-SEID for the session or sessions in the CSIDLIST corresponding to the main SMF, and remove a migration flag of the session or sessions in the CSIDLIST corresponding to the main SMF.

After the main SMF sends the fourth request to the UPF, the method may further include the following operation.

The main SMF receives a fourth response to the fourth request from the UPF.

In some exemplary implementations of the embodiment, the fourth response to the fourth request carries the Node ID of the main SMF. The fourth response to the fourth request is used for notifying the main SMF that the UPF accepts or rejects the fourth request.

In some exemplary implementations of the embodiment, in a case where the backup SMF has taken over the CSIDLIST corresponding to the backup SMF and the main SMF recovers from the failure, the method may further include the following operation.

A notification message is sent to the backup SMF through an NRF. In some exemplary implementations of the embodiment, the notification message is used for notifying the backup SMF that the main SMF recovers from the failure, so that the backup SMF, when receiving a message or messages related to a session or sessions after the main SMF recovers from the failure, redirects the received message or messages to the main SMF.

In some exemplary implementations of the embodiment, the third request is an extended PFCP Session Set Modification Request.

In some exemplary implementations of the embodiment, the third response to the third request is an extended PFCP Session Set Modification Response.

Seventh Embodiment

FIG. 9 is a schematic flowchart of a method for implementing disaster recovery provided by a seventh embodiment of the present disclosure. As shown in FIG. 9, the method includes operations 901 and 902.

In operation 901, a UPF receives a third request sent by a main SMF.

In the embodiment, the third request carries a Node ID of the main SMF, a Node ID of a backup SMF, and a CSIDLIST corresponding to the main SMF. The third request is used for notifying the UPF that the main SMF recovers from a failure and a session or sessions in the CSIDLIST corresponding to the main SMF is/are to be taken over by the main SMF.

In operation 902, the UPF sets a state of the main SMF in a stored correspondence table between the main SMF and the backup SMF to normal according to the third request, and subsequently interacts with the main SMF for the session or sessions in the CSIDLIST corresponding to the main SMF.

In the embodiment, the correspondence table includes the state of the main SMF, the backup SMF corresponding to the main SMF, and the CSIDLIST corresponding to the backup SMF.

After the main UPF receives the third request sent by the main SMF, the method may further include the following operation.

The UPF sends a third response to the third request to the main SMF.

In some exemplary implementations of the embodiment, the third response to the third request carries the Node ID of the main SMF. The third response to the third request is used for notifying the main SMF that the UPF accepts or rejects the third request.

In some exemplary implementations of the embodiment, in a case of determining, according to a condition of the UPF, that the UPF is capable of setting the state of the main SMF in the stored correspondence table between the main SMF and the backup SMF to normal, the UPF sends a third response for accepting the third request to the SMF.

In some exemplary implementations of the embodiment, in a case of determining, according to the condition of the UPF, that the UPF is not capable of setting the state of the main SMF in the stored correspondence table between the main SMF and the backup SMF to normal, the UPF sends the third response for rejecting the third request to the SMF.

In some exemplary implementations of the embodiment, after the UPF sets the state of the main SMF in the stored correspondence table between the main SMF and the backup SMF to normal according to the third request, or after the UPF sends the third response for accepting the third request to the SMF, the method may further include the following operations.

The UPF receives a fourth request sent by the backup SMF.

In some exemplary implementations of the embodiment, the fourth request carries a CP F-SEID, an IP address in the CP F-SEID being updated to an IP address of the main SMF. The fourth request is used for notifying the UPF to record the updated CP F-SEID for the session or sessions in the CSIDLIST corresponding to the main SMF, and remove, from the correspondence table, a migration flag of the session or sessions in the CSIDLIST.

The UPF records the updated CP F-SEID for the session or sessions in the CSIDLIST corresponding to the main SMF according to the fourth request, and removes the migration flag of the session or sessions in the CSIDLIST from the correspondence table.

After the UPF receives the fourth request sent by the backup SMF, the method may further include the following operation.

The UPF sends a fourth response to the fourth request to the main SMF.

In some exemplary implementations of the embodiment, the fourth response to the fourth request carries the Node ID of the main SMF. The fourth response to the fourth request is used for notifying the main SMF that the UPF accepts or rejects the fourth request.

The technical solutions provided by the sixth embodiment and the seventh embodiment of the present disclosure are described in detail through two exemplary embodiments.

Eighth Embodiment

The eighth embodiment of the present disclosure corresponds to a scenario in which the main SMF corresponds to one backup SMF and the backup SMF has taken over the session range CSIDLIST of the main SMF in the fourth embodiment.

Figure 10:
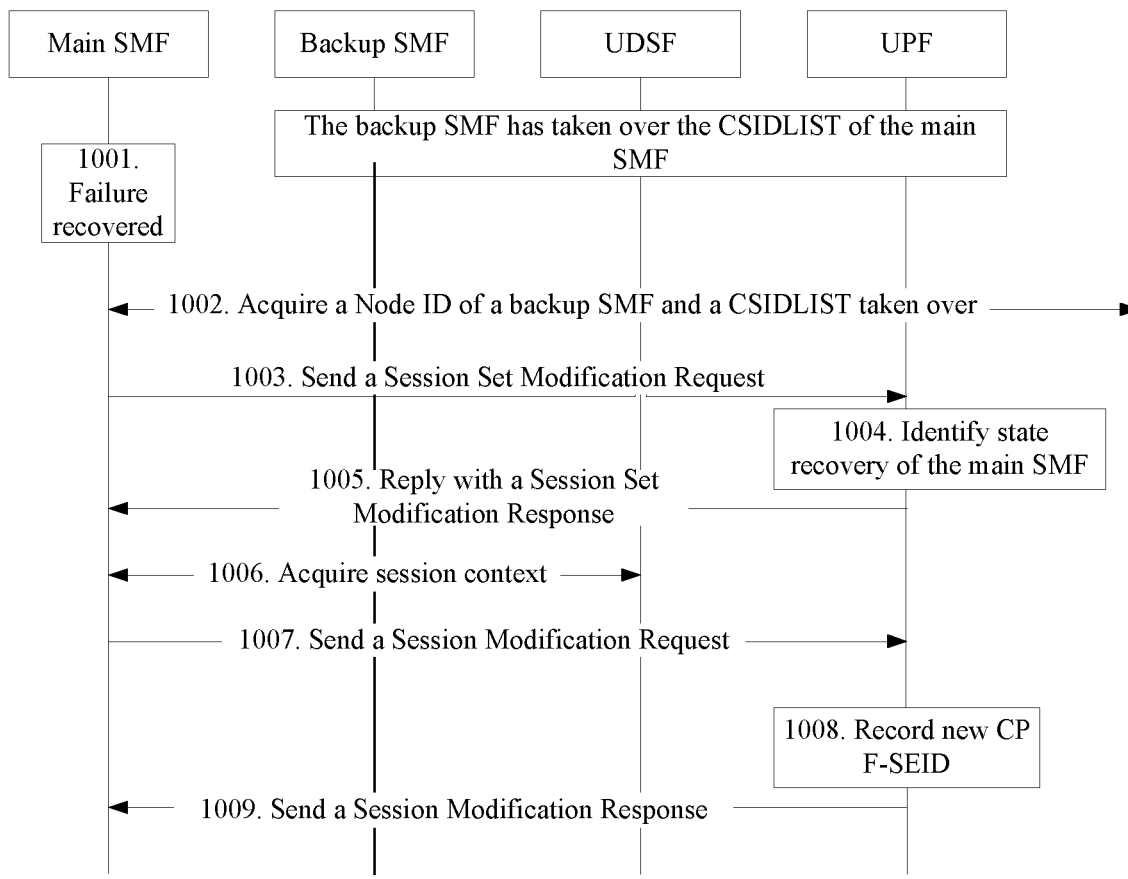
FIG. 10 is a schematic flowchart of a method for implementing disaster recovery according to an eighth embodiment of the present disclosure.

FIG. 10 is a schematic flowchart of a method for implementing disaster recovery provided by an eighth embodiment of the present disclosure. As shown in FIG. 10, the method includes operations 1001 to 1009.

In operation 1001, a main SMF recovers from a failure.

In the embodiment, in a case where the main SMF fails, the backup SMF and the UPF have performed session migration, as described in the first to seventh embodiments.

In operation 1002, after recovering from the failure, the main SMF acquires from the NRF the Node ID of the backup SMF and the CSIDLIST taken over.

In the embodiment, the main SMF determines the session migration records and the rollback manner through the NRF, and acquires the CSIDLIST to be taken back according to the configuration information in the NRF.

After the main SMF recovers from the failure, the NRF notifies the backup SMF that the main SMF has recovered, and the backup SMF stops processing session information, and if session information is still received, the backup SMF redirects the session information to the main SMF.

In operation 1003, the main SMF sends a Session Set Modification Request to the UPF.

In the embodiment, the main SMF may acquire, through the UDSF, the address information of the UPF that has established at least one session with the backup SMF.

In the embodiment, the Session Set Modification Request carries the Node ID of the main SMF, the Node ID of the backup SMF, and the CSIDLIST. The Session Set Modification Request is used for notifying the UPF that the main SMF recovers from the failure and that the session or sessions in the CSIDLIST is/are to be taken over by the main SMF.

In operation 1004, the UPF identifies state recovery of the main SMF.

In the embodiment, the UPF sets the state of the main SMF to normal in the correspondence table recording the mapping relation between the main SMF+CSIDLIST and the backup SMF, and interacts with the main SMF for the subsequent session or sessions. The correspondence table includes the state of the main SMF, the backup SMF, and the CSIDLIST taken over.

In operation 1005, the UPF sends a Session Set Modification Response to the main SMF.

In the embodiment, the Session Set Modification Response carries the Node ID of the main SMF and is used for notifying the main SMF that the UPF accepts the Session Set Modification Request.

Generally, in a case of determining, according to a condition of the UPF, that the UPF is able to set the state of the main SMF in the stored correspondence table to normal, the UPF sends a Session Set Modification Response indicating acceptance of the Session Set Modification Request to the SMF. However, in a case of determining, according to the condition of the UPF, that the UPF is not able to set the state of the main SMF in the stored correspondence table to normal, for example, in a case where the UPF is overloaded and cannot process the message, the UPF sends the Session Set Modification Response indicating rejection of the Session Set Modification Request to the SMF.

In operation 1006, the main SMF acquires context information of the migrated session or sessions from the UDSF.

In the embodiment, the SMF may acquire the context information of the migrated session or sessions from the SMF tenant space of the UDSF.

In operation 1007, the main SMF sends a Session Modification Request to the UPF to update the CP F-SEID.

In the embodiment, the Session Modification Request is an existing PFCP interface message and carries a CP F-SEID, and an IP address in the CP F-SEID is updated to an IP address of a main SMF. The Session Modification Request is used for notifying the UPF to record the updated CP F-SEID for the session or sessions in the CSIDLIST, and remove the migration flag of the session or sessions in the CSIDLIST, wherein the migration flag is used for identifying that the corresponding session or sessions is/are a migrated session or migrated sessions.

In operation 1008, after receiving the message, the UPF records the new CP F-SEID, and removes the migration flag of the session or sessions.

In the embodiment, when sending a message subsequently, the UPF directly interacts with the main SMF without determining the correspondence between the SMF+CSIDLIST and the backup SMF.

In the embodiment, when the UPF receives the Session Modification Request, the operation 1008 can be directly performed in normal cases. However, if the UPF cannot process the Session Modification Request (for example, a possible reason may be that the UPF is overloaded making it impossible for the UPF to process the Session Set Modification Request), the UPF may directly send a Session Modification Response for rejecting the request to the main SMF, and the update of the CP F-SEID fails.

In operation 1009, the UPF sends a Session Modification Response to the SMF.

The Session Modification Response is an existing PFCP interface message. The Session Modification Response carries a Node ID of the main SMF, and is used for notifying the main SMF that the UPF accepts the Session Modification Request.

According to the technical solution provided in the eighth embodiment of the present disclosure, after recovering from a failure, a main SMF sends a PFCP Session Set Modification to a UPF to perform batch session migration, and the UPF identifies that a state of the main SMF recovers; then, the SMF notifies, by sending a PFCP Session Modification, the UPF to update the session information including CP F-SEID, and the UPF updates the session information and removes the migration flag of the session or sessions, and interacts with the main SMF for the subsequent session or sessions. In this way, the messages such as the PFCP Session Set Modification Request/PFCP Session Set Modification Response are extended to implement batch session migration and ensure session continuity.

Ninth Embodiment

The ninth embodiment of the present disclosure corresponds to a scenario in which the main SMF corresponds to two backup SMFs and the backup SMF1 and the backup SMF2 have taken over the session range CSIDLIST1 and CSIDLIST2 of the main SMF in the fifth embodiment.

Figure 11:
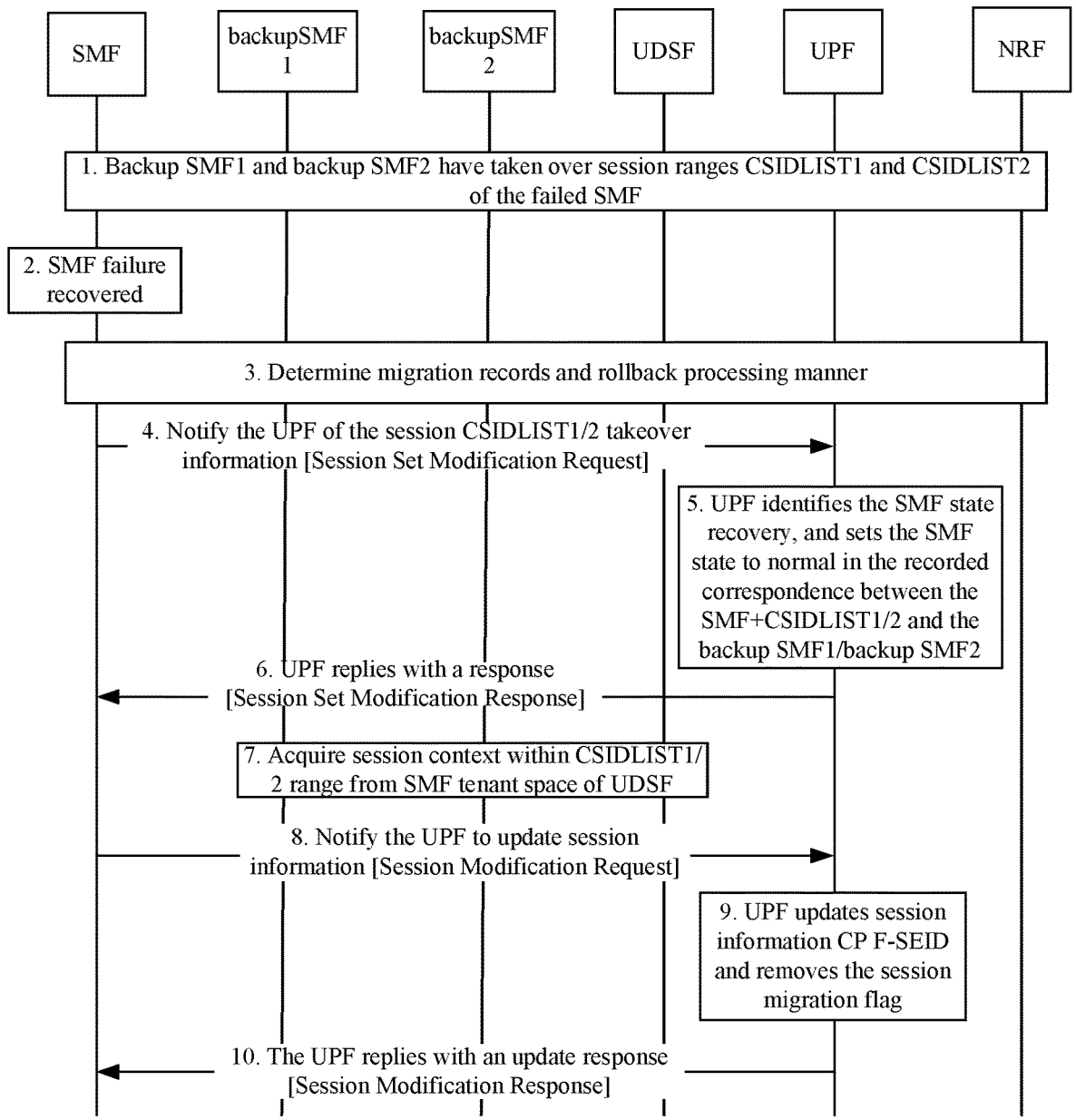
FIG. 11 is a schematic flowchart of a method for implementing disaster recovery according to a ninth embodiment of the present disclosure.

FIG. 11 is a schematic flowchart of a method for implementing disaster recovery according to a ninth embodiment of the present disclosure. As shown in FIG. 11, the method includes operations 1101 to 1110.

In operation 1101, a main SMF recovers from a failure.

Before the present operation, the backup SMF1 and the backup SMF2 have taken over the session ranges CSIDLIST1 and CSIDLIST2 of the failed SMF.

In operation 1102, after recovering from the failure, the main SMF determines, through the NRF, the session migration records and the rollback manner, and acquires a CSIDLIST to be taken back according to the configuration.

Meanwhile, the NRF notifies the backup SMF1 and the backup SMF2 that the main SMF has recovered. After receiving the notification, the Backup SMF1 and the backup SMF2 stop processing the session or sessions, and when receiving a session message, the backup SMF1 and the backup SMF2 redirect the received session message to the main SMF.

After taking over the session ranges CSIDLIST1 and CSIDLIST2 of the failed SMF, the backup SMF1 and the backup SMF2 also interact with the NRF to update the session information, and sets the session or sessions that can be migrated from the main SMF.

In operation 1103, the main SMF sends a Session Set Modification Request to the UPF.

In the embodiment, the Session Set Modification Request carries parameters such as a Node ID of the main SMF, a Node ID of the backup SMF1, a Node ID of the backup SMF2, the CSIDLIST1, and the CSIDLIST 2. The Session Set Modification Request serves as a takeover notification, and is used for notifying the UPF that the main SMF recovers from the failure and that the session or sessions in the CSIDLIST1 and the CSIDLIST2 is/are to be taken over by the main SMF.

In operation 1104, the UPF identifies that the state of the main SMF is recovered, and sets the state of the main SMF to normal in a correspondence table for recording the correspondence between the main SMF+CSIDLIST1/2 and the backup SMF1/backup SMF2.

The UPF interacts with the main SMF for the subsequent session or sessions.

When the UPF receives the Session Set Modification Request, the operation 1104 may be directly performed in normal cases. However, if the UPF is not able to process the Session Set Modification Request (for example, a possible reason may be that the UPF is overloaded making it impossible for the UPF to process the Session Set Modification Request), the UPF may directly send a Session Set Modification Response for rejecting the request to the main SMF, and the session migration fails.

In operation 1105, the UPF sends a Session Set Modification Response to the main SMF.

In the embodiment, the Session Set Modification Response carries the Node ID of the main SMF, and is used for notifying the main SMF that the UPF accepts the Session Set Modification Request.

In operation 1106, the main SMF acquires context information of the migrated session or sessions from the SMF tenant space of the UDSF.

In operation 1107, the SMF sends a Session Modification Request to the UPF to update the CP F-SEID.

In the embodiment, the Session Modification Request is an existing PFCP interface message. The Session Modification Request carries a CP F-SEID, and an IP address in the CP F-SEID is updated to an IP address of a main SMF, and is used for notifying the UPF to record the updated CP F-SEID for the session or sessions in the CSIDLIST, and remove the migration flag of the session or sessions in the CSIDLIST.

In operation 1108, after receiving the message, the UPF records the new CP F-SEID, and removes the migration flag of the session or sessions.

In the embodiment, when sending a message subsequently, the UPF does not determine the correspondence between the SMF+CSIDLIST1/2 and the backup SMF1/backup SMF2, but directly interacts with the main SMF.

In the embodiment, when the UPF receives the Session Modification Request, the operation 1108 may be directly performed in normal cases. However, if the UPF is not able to process the Session Modification Request (for example, a possible reason may be that the UPF is overloaded making it impossible for the UPF to process the Session Set Modification Request), the UPF may directly send a Session Modification Response for rejecting the request to the main SMF, and the update of the CP F-SEID fails.

In operation 1109, the UPF sends a Session Modification Response to the main SMF.

In the embodiment, the Session Modification Response is an existing PFCP interface message. The Session Modification Response carries the Node ID of the main SMF, and is used for notifying the main SMF that the UPF accepts the Session Modification Request.

According to the technical solution provided in the ninth embodiment of the present disclosure, after recovering from a failure, a main SMF acquires, according to the configuration, a session or sessions (which is/are defined as CSIDLIST1/2) needing to be taken back; then the SMF sends a PFCP Session Set Modification to the UPF to perform batch session migration, and the UPF identifies that the state of the main SMF is recovered; then, the SMF notifies, by sending a PFCP Session Modification, the UPF to update session information including the CP F-SEID, the UPF updates the session information and removes the migration flag of the session or sessions, and interacts with the main SMF for the subsequent session or sessions.

Figure 12:
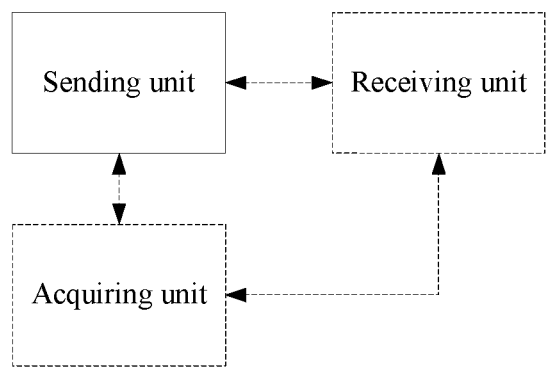
FIG. 12 is a schematic structural diagram of a backup SMF according to an embodiment of the present disclosure.

An embodiment of the present disclosure provides a backup SMF, as shown in FIG. 12, including:

a sending unit, configured to send a first request to a UPF in a case where a main SMF fails.

In the embodiment, the first request carries a Node ID of the main SMF, a Node ID of the backup SMF and a CSIDLIST corresponding to the backup SMF. The first request is used for notifying the UPF that the main SMF fails and a session or sessions in the CSIDLIST corresponding to the backup SMF is/are to be taken over by the backup SMF, so that the UPF subsequently interacts with the backup SMF for the session or sessions in the CSIDLIST corresponding to the backup SMF.

The backup SMF may further include a receiving unit.

The receiving unit is configured to, after the backup SMF sends the first request to the UPF, receive a first response to the first request from the UPF.

In some exemplary implementations of the embodiment, the first response to the first request carries the Node ID of the backup SMF, and the first response to the first request is used for notifying the backup SMF that the UPF accepts or rejects the first request.

In some exemplary implementations of the embodiment, the receiving unit is further configured to receive a notification message sent by an NRF before the backup SMF sends the first request message to the UPF.

In some exemplary implementations of the embodiment, the notification message carries the Node ID of the main SMF, the Node ID of the backup SMF, and the CSIDLIST corresponding to the backup SMF. The notification message is used for notifying the backup SMF that the main SMF fails and the backup SMF takes over the session or sessions in the CSIDLIST corresponding to the backup SMF.

The backup SMF may further include an acquiring unit.

The acquiring unit is configured to acquire, through an UDSF, address information of the UPF currently having established at least one session with the main SMF.

In some exemplary implementations of the embodiment, the acquiring unit is further configured to acquire from an UDSF a context of the session or sessions in the CSIDLIST corresponding to the backup SMF after the backup SMF sends the first request to the UPF or after the backup SMF receives the first response for accepting the first request from the UPF.

In some exemplary implementations of the embodiment, the sending unit is further configured to send a second request to the UPF after the backup SMF acquires from the UDSF the context of the session or sessions in the CSIDLIST corresponding to the backup SMF.

In some exemplary implementations of the embodiment, the second request carries a CP F-SEID acquired from the context, an IP address in the CP F-SEID being updated to an IP address of the backup SMF. The second request is used for notifying the UPF to record the updated CP F-SEID for the session or sessions in the CSIDLIST, and set a migration flag for the session or sessions in the CSIDLIST, wherein the migration flag is used for identifying the corresponding session or sessions as migrated session or sessions.

The receiving unit is further configured to receive a second response to the second request from the UPF after the backup SMF sends the second request to the UPF. The second response to the second request carries a Node ID of the backup SMF, and the second response to the second request is used for notifying the backup SMF that the UPF accepts or rejects the second request.

Before the receiving unit receives the notification message sent by the NRF, the main SMF has established at least one session with the UPF, registers a main-backup relation on the NRF, and sets the CSIDLIST corresponding to the backup SMF.

In some exemplary implementations of the embodiment, the first request is an extended Packet Forwarding Control Protocol node-type message Session Set Modification Request (PFCP Session Set Modification Request).

In some exemplary implementations of the embodiment, the first response to the first request is an extended Packet Forwarding Control Protocol node-type message Session Set Modification Response (PFCP Session Set Modification Response).

Figure 13:
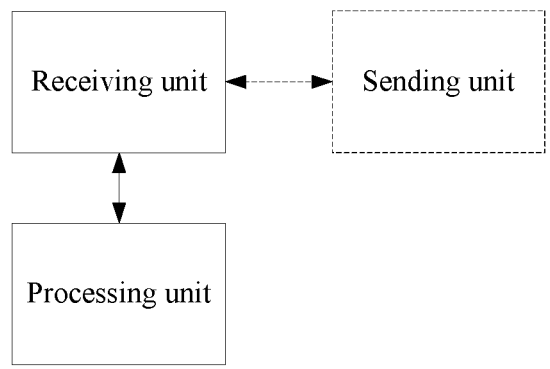
FIG. 13 is a schematic structural diagram of a UPF according to an embodiment of the present disclosure.

An embodiment of the present disclosure provides a UPF, as shown in FIG. 13, including a receiving unit and a processing unit.

The receiving unit is configured to receive a first request sent by a backup SMF.

In the embodiment, the first request carries a Node ID of the main SMF, a Node ID of the backup SMF, and a CSIDLIST corresponding to the backup SMF. The first request is used for notifying the UPF that the main SMF fails and a session or sessions in the CSIDLIST corresponding to the backup SMF is/are to be taken over by the backup SMF.

The processing unit is configured to record a correspondence table between the main SMF and the backup SMF according to the first request, and subsequently interact with the backup SMF for the session or sessions in the CSIDLIST corresponding to the backup SMF. In the embodiment, the correspondence table includes a state of the main SMF, the backup SMF corresponding to the main SMF, and the CSIDLIST corresponding to the backup SMF.

The UPF may further include a sending unit.

The sending unit is configured to send a first response to the first request to a backup SMF after the UPF receives the first request sent by the backup SMF.

In some exemplary implementations of the embodiment, the first response to the first request carries the Node ID of the backup SMF. The first response to the first request is used for notifying the backup SMF that the UPF accepts or rejects the first request.

In some exemplary implementations of the embodiment, in a case of determining, according to a condition of the UPF, that the UPF is capable of recording the correspondence table between the main SMF and the backup SMF, the sending unit is configured to send the first response for accepting the first request to the SMF.

In some exemplary implementations of the embodiment, in a case of determining, according to the condition of the UPF, that the UPF is not capable of recording the correspondence table between the main SMF and the backup SMF, the sending unit is configured to send the first response for rejecting the first request to the SMF.

In some exemplary implementations of the embodiment, the receiving unit is further configured to, after the UPF records the correspondence table between the main SMF and the backup SMF according to the first request, or after the UPF sends the first response for accepting the first request to the SMF, receive a second request sent by the backup SMF.

In some exemplary implementations of the embodiment, the second request carries a CP F-SEID, an IP address in the CP F-SEID being updated to an IP address of the backup SMF. The second request is used for notifying the UPF to record the updated CP F-SEID for the session or sessions in the CSIDLIST corresponding to the backup SMF, and set a migration flag for the session or sessions in the CSIDLIST corresponding to the backup SMF, wherein the migration flag is used for identifying the corresponding session or sessions as migrated session or sessions.

The processing unit is further configured to record the updated CP F-SEID for the session or sessions in the CSIDLIST corresponding to the backup SMF according to the second request, and set a migration flag for the session or sessions in the CSIDLIST in the correspondence table.

In some exemplary implementations of the embodiment, the sending unit is further configured to send a second response to the second request to the backup SMF after the UPF receives the second request sent by the backup SMF.

In some exemplary implementations of the embodiment, the second response to the second request carries the Node ID of the backup SMF. The second response to the second request is used for notifying the backup SMF that the UPF accepts or rejects the second request.

In some exemplary implementations of the embodiment, the sending unit is further configured to, in a case where the UPF needs to send a message or messages related to the session or sessions in the CSIDLIST corresponding to the backup SMF, acquire the state of the main SMF according to the correspondence table; and send the message or messages to the backup SMF in a case where the state of the main SMF indicates that the main SMF fails.

Figure 14:
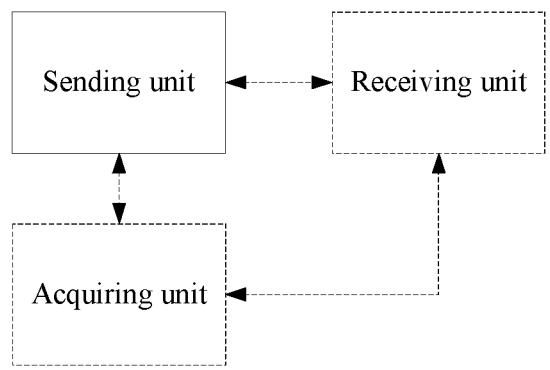
FIG. 14 is a schematic structural diagram of a main SMF according to an embodiment of the present disclosure.

An embodiment of the present disclosure provides a main SMF, as shown in FIG. 14, including:

a sending unit, configured to send a third request to a UPF in a case where a backup SMF has taken over a session or sessions in a CSIDLIST corresponding to the backup SMF and a main SMF recovers from a failure.

In the embodiment, the third request carries a Node ID of the main SMF, a Node ID of the backup SMF, and a CSIDLIST corresponding to the main SMF. The third request is used for notifying the UPF that the main SMF recovers from a failure and that a session or sessions in the CSIDLIST corresponding to the main SMF is/are to be taken over by the main SMF, so that the UPF subsequently interacts with the main SMF for the session or sessions in the CSIDLIST corresponding to the main SMF.

In some exemplary implementations of the embodiment, the main SMF may further include an acquiring unit.

The acquiring unit is configured to acquire the Node ID of the backup SMF and the CSIDLIST corresponding to the main SMF from an NRF before the main SMF sends the third request to the UPF; and acquiring, through a UDSF, address information of the UPF that has established at least one session with the backup SMF.

In some exemplary implementations of the embodiment, the main SMF further includes a receiving unit.

The receiving unit is configured to, after the main SMF sends the third request to the UPF, receive a third response to the third request from the UPF.

In some exemplary implementations of the embodiment, the third response to the third request carries a Node ID of the main SMF, and the third response to the third request is used for notifying the main SMF that the UPF accepts or rejects the third request.

In some exemplary implementations of the embodiment, the acquiring unit is further configured to, after the main SMF sends the third request to the UPF or after the main SMF receives from the UPF the third response for accepting the third request, acquire from an UDSF a context of the session or sessions in the CSIDLIST corresponding to the main SMF.

In some exemplary implementations of the embodiment, the sending unit is further configured to, after the main SMF acquires the context of the session or sessions in the CSIDLIST corresponding to the main SMF from the UDSF, send a fourth request to the UPF.

In some exemplary implementations of the embodiment, the fourth request carries a CP F-SEID acquired from the context, an IP address in the CP F-SEID being updated to an IP address of the main SMF. The fourth request is used for notifying the UPF to record the updated CP F-SEID for the session or sessions in the CSIDLIST corresponding to the main SMF, and remove a migration flag of the session or sessions in the CSIDLIST corresponding to the main SMF.

In some exemplary implementations of the embodiment, the receiving unit is further configured to, after the main SMF sends the fourth request to the UPF, receive a fourth response to the fourth request from the UPF.

In some exemplary implementations of the embodiment, the fourth response to the fourth request carries the Node ID of the main SMF, and the fourth response to the fourth request is used for notifying the main SMF that the UPF accepts or rejects the fourth request.

In some exemplary implementations of the embodiment, the sending unit is further configured to, in a case where the backup SMF has taken over the CSIDLIST corresponding to the backup SMF and the main SMF has recovered from the failure, send a notification message to the backup SMF through an NRF, wherein the notification message is used for notifying the backup SMF that the main SMF recovers from the failure, so that the backup SMF, when receiving a message or messages related to the session or sessions after the main SMF recovers from the failure, redirects the message or messages to the main SMF.

In some exemplary implementations of the embodiment, the third request is an extended PFCP Session Set Modification Request.

In some exemplary implementations of the embodiment, the third response to the third request is an extended PFCP Session Set Modification Response.

Figure 15:
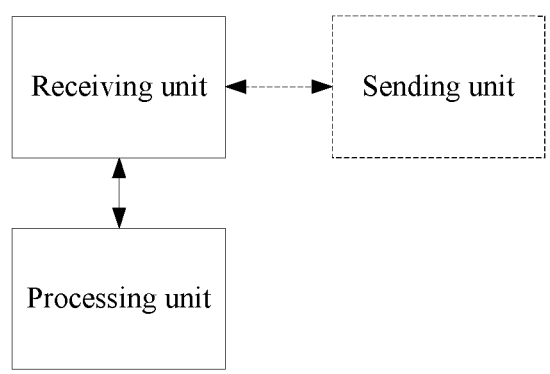
FIG. 15 is a schematic structural diagram of another UPF according to an embodiment of the present disclosure.

An embodiment of the present disclosure provides another UPF, as shown in FIG. 15, including a receiving unit and a processing unit.

The receiving unit is configured to receive a third request sent by a main SMF.

In the embodiment, the third request carries a Node ID of the main SMF, a Node ID of a backup SMF, and a CSI-DLIST corresponding to the main SMF. The third request is used for notifying the UPF that the main SMF recovers from a failure and a session or sessions in the CSIDLIST corresponding to the main SMF is/are to be taken over by the main SMF.

The processing unit is configured to set a state of the main SMF in a stored correspondence table between the main SMF and the backup SMF to normal according to the third request, and to subsequently interact with the main SMF for the session or sessions in the CSIDLIST corresponding to the main SMF. In the embodiment, the correspondence table includes the state of the main SMF, the backup SMF corresponding to the main SMF, and the CSIDLIST corresponding to the backup SMF.

In some exemplary implementations of the embodiment, the UPF may further include a sending unit.

The sending unit is configured to send a third response to the third request to a main SMF after the main UPF receives the third request sent by the main SMF.

In some exemplary implementations of the embodiment, the third response to the third request carries a Node ID of the main SMF, and the third response to the third request is used for notifying the main SMF that the UPF accepts or rejects the third request.

In some exemplary implementations of the embodiment, in a case of determining, according to a condition of the UPF, that the UPF is capable of setting the state of the main SMF in the stored correspondence table between the main SMF and the backup SMF to normal, the sending unit is configured to send the third response for accepting the third request to the SMF.

In some exemplary implementations of the embodiment, in a case of determining, according to the condition of the UPF, that the UPF is not capable of setting the state of the main SMF in the stored correspondence table between the main SMF and the backup SMF to normal, the sending unit is configured to send the third response for rejecting the third request to the SMF.

In some exemplary implementations of the embodiment, the receiving unit is further configured to, after the UPF sets the state of the main SMF in the stored correspondence table between the main SMF and the backup SMF to normal according to the third request, or after the UPF sends the third response for accepting the third request to the SMF, receive a fourth request sent by the backup SMF.

In some exemplary implementations of the embodiment, the fourth request carries a CPF-SEID, an IP address in the CP F-SEID being updated to an IP address of the main SMF. The fourth request is used for notifying the UPF to record the updated CP F-SEID for the session or sessions in the CSIDLIST corresponding to the main SMF, and remove, from the correspondence table, a migration flag of the session or sessions in the CSIDLIST.

The processing unit is further configured to record the updated CP F-SEID for the session or sessions in the CSIDLIST corresponding to the main SMF according to the fourth request, and remove, from the correspondence table, the migration flag of the session or sessions in the CSIDLIST.

The sending unit is further configured to, after the UPF receives the fourth request sent by the backup SMF, send a fourth response to the fourth request to the main SMF.

In some exemplary implementations of the embodiment, the fourth response to the fourth request carries the Node ID of the main SMF, and the fourth response to the fourth request is used for notifying the main SMF that the UPF accepts or rejects the fourth request.

An embodiment of the present disclosure provides a backup SMF, including a memory, a processor, and a computer program stored in the memory and capable of running on the processor. The computer program, when executed by the processor, performs any method for implementing disaster recovery executed by the backup SMF.

An embodiment of the present disclosure provides a main SMF, including a memory, a processor and a computer program stored in the memory and capable of running on the processor. The computer program, when executed by the processor, performs the method for implementing disaster recovery executed by the main SMF.

An embodiment of the present disclosure provides a UPF, including a memory, a processor, and a computer program stored in the memory and capable of running on the processor. The computer program, when executed by the processor, performs any one of the methods for implementing disaster recovery executed by the UPF.

An embodiment of the present disclosure provides a computer readable storage medium. The computer readable storage medium stores an information processing program, and when the information processing program is executed by a processor, the operations of any one of the foregoing methods for implementing disaster recovery are implemented.

Those having ordinary skill in the art can appreciate that all or some of the operations of the methods described above, and the functional blocks/units in the systems and devices can be implemented as software, firmware, hardware, or any suitable combination thereof. In a hardware implementation, the division of the functional modules/units referred to in the above description does not necessarily correspond to the division of physical components. For example, one physical component may have multiple functions, or one function or operation may be cooperatively performed by several physical components. Certain components or components may be implemented as software executed by a processor, such as a digital signal processor or microprocessor, or may be implemented as hardware, or as an integrated circuit, such as an application specific integrated circuit. Such software may be distributed on computer-readable medium, which may include computer storage medium (or non-transitory medium) and communication medium (or transitory medium). As is well known to those having ordinary skill in the art, the term computer storage medium includes volatile and non-volatile, removable and non-removable medium implemented in any method or technique for storing information (such as computer readable instructions, data structures, program modules, or other data). The computer storage medium includes, but is not limited to, RAM, ROM, EEPROM, flash memory or other memory technology, CD-ROM, digital versatile discs (DVD) or other optical disk storage, magnetic cassettes, magnetic tape, magnetic disk storage or other magnetic storage devices, or any other medium which can be used to store the desired information and which can be accessed by a computer. In addition, the communication medium typically stores computer readable instructions, data structures, program modules, or other data in a modulated data signal such as a carrier wave or other transport mechanism and may include any information delivery medium as is known to those having ordinary skill in the art.

Although the embodiments disclosed in the present disclosure are described above, the described contents are only the embodiments adopted to facilitate understanding to the embodiments of the present disclosure, and are not intended to limit the present disclosure. Those having ordinary skill in the art can make various modifications and variations to the embodiments of the present disclosure without departing from the principle and scope of the embodiments of the present disclosure. The scope of the present disclosure is defined by the appended claims.

INDUSTRIAL APPLICABILITY

As described above, the methods and the related devices for implementing disaster recovery provided by the embodiments of the present disclosure have the following beneficial effects. In a case where a main SMF fails, a UPF is enabled to identify the failed SMF and acquire the backup SMF and the original session information, thereby implementing batch session migration and ensuring session continuity.

What is claimed is:

1. A method for implementing disaster recovery, comprising:
based on determination that a main Session Management Function (SMF) fails, sending, by a backup SMF, a first request to a User Plane Function (UPF),
wherein the first request carries a node identifier (Node ID) of the main SMF, a Node ID of the backup SMF and a Common Session endpoint Identifier List (CSIDLIST) corresponding to the backup SMF, a session or sessions in the CSIDLIST corresponding to the backup SMF is/are the same as session or sessions in a CSIDLIST corresponding to the main SMF or is/are a part of the session or sessions in the CSIDLIST corresponding to the main SMF, and the first request is used for notifying the UPF that the main SMF fails and the session or sessions in the CSIDLIST corresponding to the backup SMF is/are to be taken over by the backup SMF, so that the UPF subsequently interacts with the backup SMF for the session or sessions in the CSIDLIST corresponding to the backup SMF.

2. The method according to claim 1, after sending, by the backup SMF, the first request to the UPF, further comprising:
receiving, by the backup SMF, a first response to the first request from the UPF,
wherein the first response to the first request carries the Node ID of the backup SMF, and the first response to the first request is used for notifying the backup SMF that the UPF accepts or rejects the first request.

3. The method according to claim 1, before sending, by the backup SMF, the first request to the UPF, further comprising:
receiving, by the backup SMF, a notification message sent by a Network Function Repository Function (NRF),
wherein the notification message carries the Node ID of the main SMF, the Node ID of the backup SMF, and the CSIDLIST corresponding to the backup SMF, and the notification message is used for notifying the backup SMF that the main SMF fails and the backup SMF takes over the session or sessions in the CSIDLIST corresponding to the backup SMF; and
acquiring, through an Unstructured Data Storage Function (UDSF) by the backup SMF, address information of the UPF that has established at least one session with the main SMF.

4. The method according to claim 2, after sending, by the backup SMF, the first request to the UPF or after receiving, by the backup SMF, the first response for accepting the first request from the UPF, further comprising:
acquiring, by the backup SMF, context of the session or sessions in the CSIDLIST corresponding to the backup SMF from an Unstructured Data Storage Function (UDSF).

5. The method according to claim 4, after acquiring, by the backup SMF, the context of the session or sessions in the CSIDLIST corresponding to the backup SMF from the UDSF, further comprising:
sending, by the backup SMF, a second request to the UPF, wherein the second request carries a Control Plane (CP) Fully Qualified Session Endpoint Identifier (F-SEID) acquired from the context, an Internet Protocol (IP) address in the CP F-SEID being updated to an IP address of the backup SMF; and the second request is used for notifying the UPF to record the updated CP F-SEID for the session or sessions in the CSIDLIST, and set a migration flag for the session or sessions in the CSIDLIST, wherein the migration flag is used for identifying the corresponding session or sessions as migrated session or sessions.

6. The method according to claim 5, before receiving, by the backup SMF, the notification message sent by the NRF, further comprising:
by the main SMF having established at least one session with the UPF, registering a main-backup relation on the NRF and configuring the CSIDLIST corresponding to the backup SMF.

7. A backup Session Management Function (SMF), comprising a memory, a processor and a computer program stored in the memory and capable of running on the processor, wherein the computer program, when executed by the processor, performs the method for implementing the disaster recovery according to claim 1.

8. A method for implementing disaster recovery, comprising:
receiving, by a User Plane Function (UPF), a first request sent by a backup Session Management Function (SMF), wherein the first request carries a node identifier (Node ID) of a main SMF, a Node ID of the backup SMF, and a Common Session endpoint Identifier List (CSIDLIST) corresponding to the backup SMF, a session or sessions in the CSIDLIST corresponding to the backup SMF is/are the same as session or sessions in a CSIDLIST corresponding to the main SMF or is/are a part of the session or sessions in the CSIDLIST corresponding to the main SMF, and the first request is used for notifying the UPF that the main SMF fails and the session or sessions in the CSIDLIST corresponding to the backup SMF is/are to be taken over by the backup SMF; and recording, by the UPF, a correspondence table between the main SMF and the backup SMF according to the first request, and subsequently interacting, by the UPF, with the backup SMF for the session or sessions in the CSIDLIST corresponding to the backup SMF, wherein the correspondence table comprises a state of the main SMF, the backup SMF corresponding to the main SMF, and the CSIDLIST corresponding to the backup SMF;
or,
receiving, by the UPF, a third request sent by a main SMF, wherein the third request carries a Node ID of the main SMF, a Node ID of a backup SMF, and a CSIDLIST corresponding to the main SMF, and the third request is used for notifying the UPF that the main SMF recovers from a failure and a session or sessions in the CSI-DLIST corresponding to the main SMF is/are to be taken over by the main SMF; and setting, by the UPF, a state of the main SMF in a correspondence table between the main SMF and the backup SMF to normal according to the third request, and subsequently interacting, by the UPF, with the main SMF for the session or sessions in the CSIDLIST corresponding to the main SMF, wherein the correspondence table comprises the state of the main SMF, the backup SMF corresponding to the main SMF, and the CSIDLIST corresponding to the backup SMF, and the session or sessions in the CSIDLIST corresponding to the backup SMF is/are the same as session or sessions in the CSIDLIST corresponding to the main SMF or is/are a part of the session or sessions in the CSIDLIST corresponding to the main SMF.

9. The method according to claim 8,
after receiving, by the UPF, the first request sent by the backup SMF, further comprising:
sending, by the UPF, a first response to the first request to the backup SMF,
wherein the first response to the first request carries the Node ID of the backup SMF, and the first response to the first request is used for notifying the backup SMF that the UPF accepts or rejects the first request;
or,
after receiving, by the UPF, the third request sent by the main SMF, further comprising:
sending, by the UPF, a third response to the third request to the main SMF,
wherein the third response to the third request carries the Node ID of the main SMF, and the third response to the third request is used for notifying the main SMF that the UPF accepts or rejects the third request.

10. The method according to claim 9, wherein
when determining, according to a condition of the UPF, that the UPF is capable of recording the correspondence table between the main SMF and the backup SMF, the UPF sends the first response for accepting the first request to the SMF; and when determining, according to the condition of the UPF, that the UPF is not capable of recording the correspondence table between the main SMF and the backup SMF, the UPF sends the first response for rejecting the first request to the SMF;
or,
when determining, according to a condition of the UPF, that the UPF is capable of setting the state of the main SMF in the stored correspondence table between the main SMF and the backup SMF to normal, the UPF sends the third response for accepting the third request to the SMF; and when determining, according to the condition of the UPF, that the UPF is not capable of setting the state of the main SMF in the stored correspondence table between the main SMF and the backup SMF to normal, the UPF sends the third response for rejecting the third request to the SMF.

11. The method according to claim 9,
after recording, by the UPF, the correspondence table between the main SMF and the backup SMF according to the first request, or after sending, by the UPF, the first response for accepting the first request to the SMF, further comprising: receiving, by the UPF, a second request sent by the backup SMF, wherein the second request carries a Control Plane (CP) Fully Qualified Session Endpoint Identifier (F-SEID), an Internet Protocol (IP) address in the CP F-SEID being updated to an IP address of the backup SMF; and the second request is used for notifying the UPF to record the updated CP F-SEID for the session or sessions in the CSIDLIST corresponding to the backup SMF, and set a migration flag for the session or sessions in the CSIDLIST corresponding to the backup SMF, wherein the migration flag is used for identifying the corresponding session or sessions as migrated session or sessions; and recording, by the UPF, the updated CP F-SEID for the session or sessions in the CSIDLIST corresponding to the backup SMF according to the second request, and setting, in the correspondence table by the UPF, the migration flag for the session or sessions in the CSIDLIST;
or,
after setting, by the UPF, the state of the main SMF in the stored correspondence table between the main SMF and the backup SMF to normal according to the third request, or after sending, by the UPF, the third response for accepting the third request to the SMF, further comprising: receiving, by the UPF, a fourth request sent by the backup SMF, wherein the fourth request carries a Control Plane (CP) Fully Qualified Session Endpoint Identifier (F-SEID), an Internet Protocol (IP) address in the CP F-SEID being updated to an IP address of the main SMF; and the fourth request is used for notifying the UPF to record the updated CP F-SEID for the session or sessions in the CSIDLIST corresponding to the main SMF, and remove, from the correspondence table, a migration flag of the session or sessions in the CSIDLIST; and recording, by the UPF, the updated CP F-SEID for the session or sessions in the CSIDLIST corresponding to the main according to the fourth request, and removing, from the correspondence table by the UPF, the migration flag of the session or sessions in the CSIDLIST.

12. The method according to claim 11,
after receiving, by the UPF, the second request sent by the backup SMF, further comprising: sending, by the UPF, a second response to the second request to the backup SMF, wherein the second response to the second request carries the Node ID of the backup SMF, and the second response to the second request is used for notifying the backup SMF that the UPF accepts or rejects the second request;
or,
after receiving, by the UPF, the fourth request sent by the backup SMF, further comprising: sending, by the UPF, a fourth response to the fourth request to the main SMF, wherein the fourth response to the fourth request carries the Node ID of the main SMF, and the fourth response to the fourth request is used for notifying the main SMF that the UPF accepts or rejects the fourth request.

13. A User Plane Function (UPF), comprising a memory, a processor and a computer program stored in the memory and capable of running on the processor, wherein the computer program, when executed by the processor, performs the method for implementing the disaster recovery according to claim 8.

14. A method for implementing disaster recovery, comprising:
based on determination that a backup Session Management Function (SMF) has taken over a session or sessions in a Common Session endpoint Identifier List (CSIDLIST) corresponding to the backup SMF and a main SMF recovers from a failure, sending, by the main SMF, a third request to a User Plane Function (UPF),
wherein the third request carries a node identifier (Node ID) of the main SMF, a Node ID of the backup SMF, and a CSIDLIST corresponding to the main SMF, a session or sessions in the CSIDLIST corresponding to the backup SMF is/are the same as session or sessions in the CSIDLIST corresponding to the main SMF or is/are a part of the session or sessions in the CSIDLIST corresponding to the main SMF, and the third request is used for notifying the UPF that the main SMF recovers from the failure and that the session or sessions in the CSIDLIST corresponding to the main SMF is/are to be taken over by the main SMF, so that the UPF subsequently interacts with the main SMF for the session or sessions in the CSIDLIST corresponding to the main SMF.

15. The method according to claim 14, before sending, by the main SMF, the third request to the UPF, further comprising:
acquiring, from a Network Function Repository Function (NRF) by the main SMF, the Node ID of the backup SMF and the CSIDLIST corresponding to the main SMF; and
acquiring, through an Unstructured Data Storage Function (UDSF) by the main SMF, address information of the UPF that has established at least one session with the backup SMF.

16. The method according to claim 14, after sending, by the main SMF, the third request to the UPF, further comprising:
receiving a third response to the third request from the UPF,
wherein the third response to the third request carries the Node ID of the main SMF, and the third response to the third request is used for notifying the main SMF that the UPF accepts or rejects the third request.

17. The method according to claim 16, after sending, by the main SMF, the third request to the UPF or after receiving, by the main SMF, the third response for accepting the third request from the UPF, further comprising:
acquiring, from an Unstructured Data Storage Function (UDSF) by the main SMF, context of the session or sessions in the CSIDLIST corresponding to the main SMF; and
sending, by the main SMF, a fourth request to the UPF,
wherein the fourth request carries a Control Plane (CP) Fully Qualified Session Endpoint Identifier (F-SEID) acquired from the context, an Internet Protocol (IP) address in the CP F-SEID being updated to an IP address of the main SMF; and the fourth request is used for notifying the UPF to record the updated CP F-SEID for the session or sessions in the CSIDLIST corresponding to the main SMF, and remove a migration flag of the session or sessions in the CSIDLIST corresponding to the main SMF.

18. The method according to claim 17, after sending, by the main SMF, the fourth request to the UPF, further comprising:
receiving, by the main SMF, a fourth response to the fourth request from the UPF,
wherein the fourth response to the fourth request carries the Node ID of the main SMF, and the fourth response to the fourth request is used for notifying the main SMF that the UPF accepts or rejects the fourth request.

19. The method according to claim 14, when the backup SMF has taken over the session or sessions in the CSIDLIST corresponding to the backup SMF and the main SMF recovers from the failure, further comprising:
sending a notification message to the backup SMF through a Network Function Repository Function (NRF), wherein the notification message is used for notifying the backup SMF that the main SMF recovers from the failure, so that the backup SMF, when receiving a message or messages related to a session or sessions after the main SMF recovers from the failure, redirects the received message or messages to the main SMF.

20. A main Session Management Function (SMF), comprising a memory, a processor and a computer program stored in the memory and capable of running on the processor, wherein the computer program, when executed by the processor, performs the method for implementing the disaster recovery according to claim 14.

* * * * *